Figure 1:
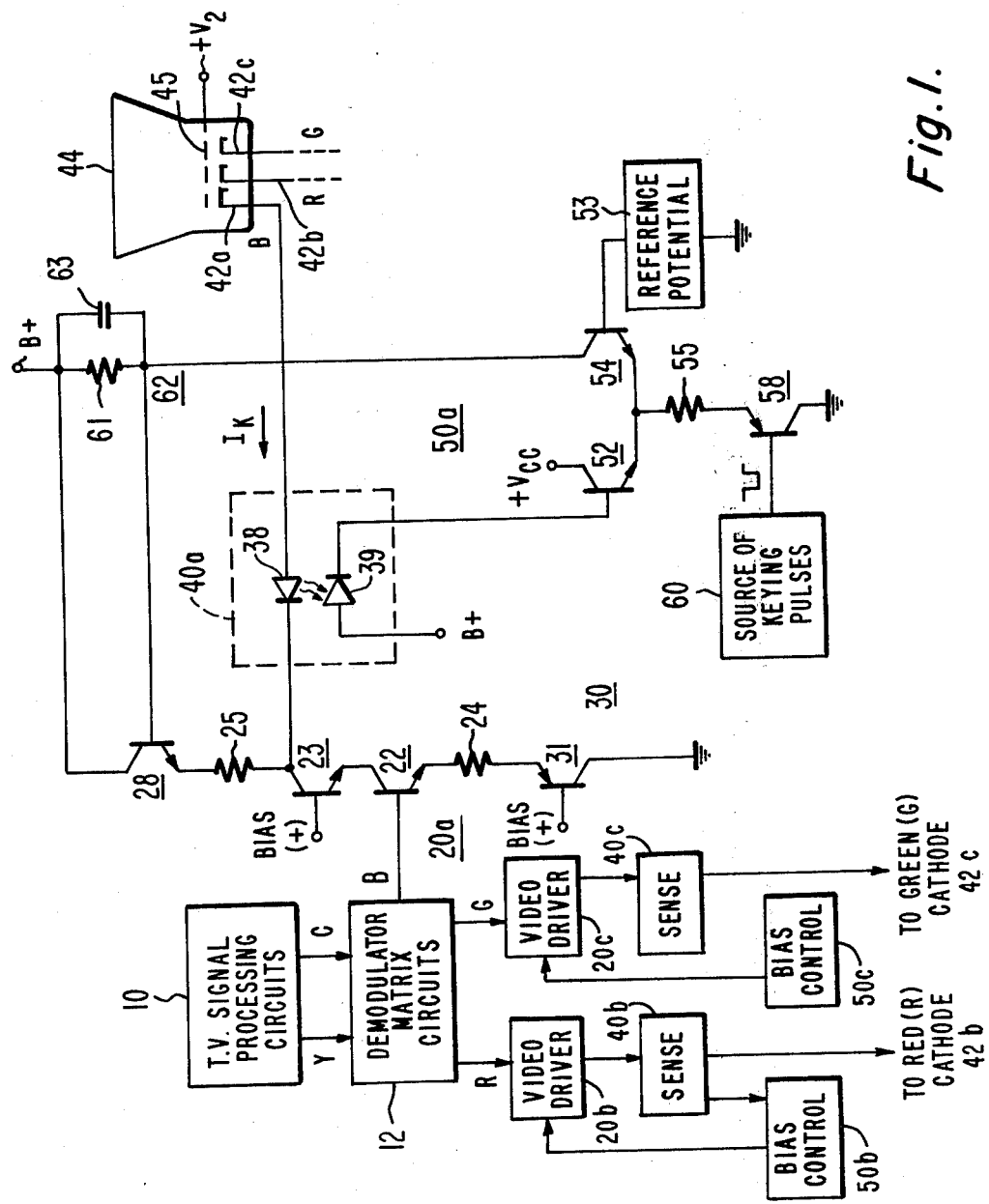

United States Patent [19]

Harwood

[11] 4,207,592
[45] Jun. 10, 1980

[54] AUTOMATIC KINESCOPE BIAS CONTROL CIRCUIT

[75] Inventor: Leopold A. Harwood, Bridgewater, N.J.

[73] Assignee: RCA Corporation, New York, N.Y.

[21] Appl. No.: 951,002

[22] Filed: Oct. 13, 1978

[51] Int. Cl.$^2$ .............................................. H04N 5/16
[52] U.S. Cl. ........................................ 358/34; 358/33; 358/171
[58] Field of Search .................... 358/171, 165, 34, 33

[56] References Cited

U.S. PATENT DOCUMENTS

| | | | |
|---|---|---|---|
| 3,449,619 | 6/1969 | Stalp | 358/165 |
| 4,012,775 | 3/1977 | Smith | 358/171 |

OTHER PUBLICATIONS

"Permanent Colour Truth," (Publication by Bang & Olufsen, Denmark).
"Towards True Color Stability in Television," *Videocolor S.A.*, Paris, France, No. 1600, Jun. 1978.
"Color Receiver Design", E. A. Jensen, *Wireless World*, Jul., 1978.

*Primary Examiner*—Richard Murray
*Attorney, Agent, or Firm*—Eugene M. Whitacre; William H. Meagher; Ronald H. Kurdyla

[57] ABSTRACT

Apparatus for automatically controlling the bias of an image reproducing color kinescope in a system incuding a plurality of video driver stages for supplying image representative video signals to respective intensity control electrodes of the electron guns of the kinescope. The output of each driver stage is coupled to an operating supply voltage via a load impedance. The electron gun currents (e.g., cathode currents) are sensed during image blanking intervals of the video signal to provide respective control voltages representative of the electron gun blanking current levels. The control voltages are respectively applied to control the output operating voltage of each driver stage, and thereby the electron gun bias, in a manner to reduce deviations of the blanking current level from a normally expected level. In one embodiment, each driver stage comprises a transistor with a video input base electrode, and a collector output electrode coupled to an electron gun. The control voltage is applied to the collector circuit of the transistor for varying the quiescent current through the load impedance and the collector quiescent output potential independent of the video signal, to thereby vary the electron gun bias in a direction for reducing the blanking current. Interaction between the control voltages and video signals is minimized, and the apparatus is suitable for use with kinescopes having separately energized grids or with kinescopes having grids energized from a common source.

13 Claims, 4 Drawing Figures

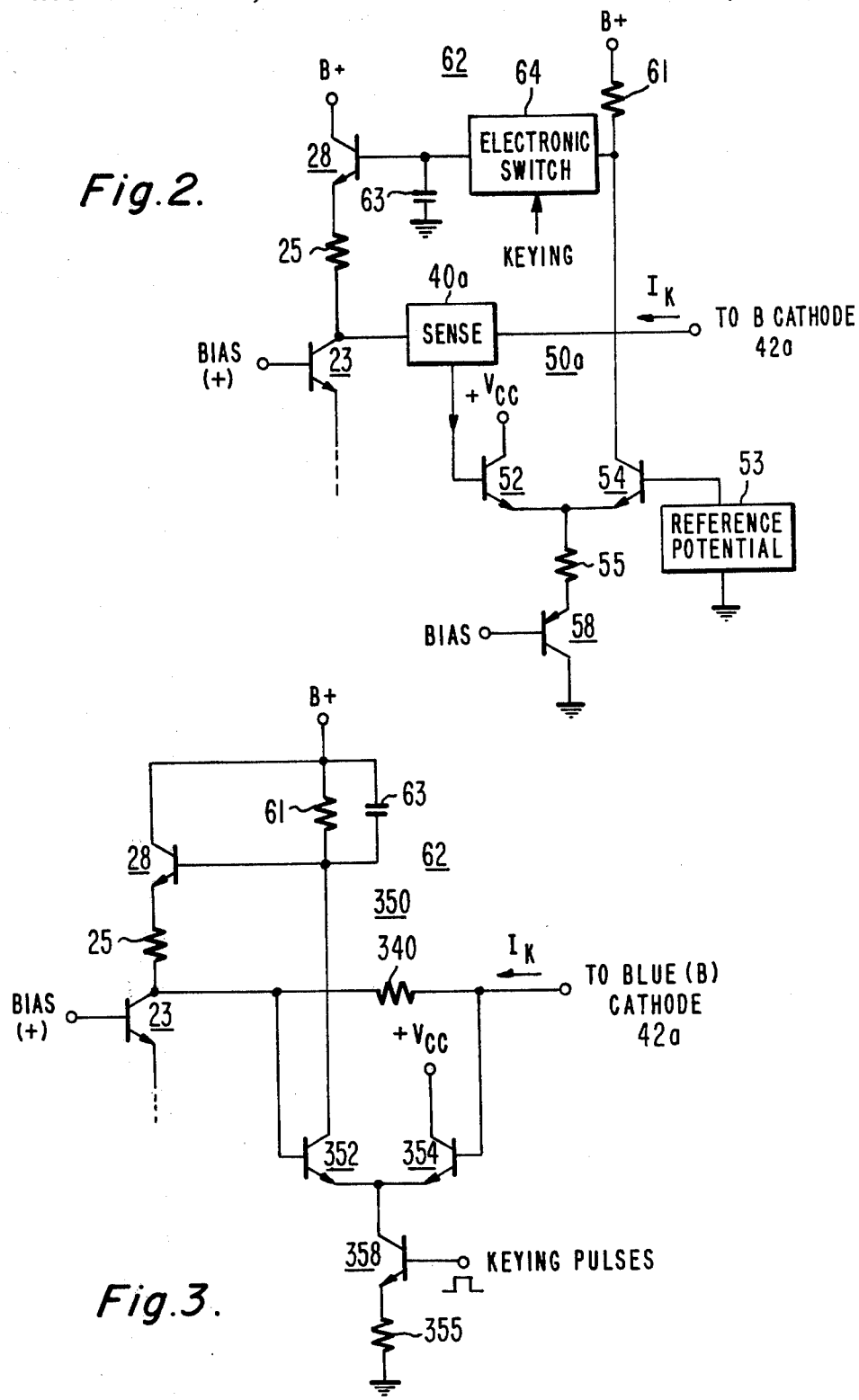

AUTOMATIC KINESCOPE BIAS CONTROL CIRCUIT

This invention relates to apparatus for automatically controlling the bias of an image reproducing kinescope in a video signal processing system such as a color television receiver or an equivalent system, in order to establish proper cut-off blanking levels for each of the electron guns of the kinescope.

A color image reproducing kinescope included in a color television receiver comprises a plurality of electron guns each energized by red, blue and green color representative signals derived from a received composite color television signal. Since a reproduced color image is defined by individual ones of these signals or a combination thereof, optimum reproduction of a color image requires that the relative proportions of these color signals be correct at all drive levels from white through gray to black, at which point the three electron guns should exhibit significantly reduced conduction or be cut-off.

The optimum reproduction of a color image and gray scale tracking of the kinescope can be adversely affected when the bias of the electron guns varies from a predetermined level, causing undesirable kinescope cut-off errors to be produced. These cut-off errors are visible as a color tint on a displayed monochrome image, and also upset the color fidelity of a displayed color image. The cut-off errors can be caused by a variety of factors, including variations in the operating characteristics of the kinescope and associated circuits (e.g., due to aging), temperature effects and momentary kinescope "flashovers."

Since it is desirable to assure that the proportioning of the color signals to the kinescope is correct at all brightness levels, color television receivers commonly include provisions for adjusting the kinescope and associated circuits in a set-up or service operating mode of the receiver in accordance with well known procedures. Briefly, a service switch having "normal" and "service" positions is operatively associated with the receiver signal processing circuits and the kinescope. In the "service" position, video signals are decoupled from the kinescope and vertical scan is collapsed. The bias of each electron gun is adjusted to establish a desired blanking or cut-off current (e.g., a few microamperes) for each electron gun. This adjustment ensures that the kinescope is properly blanked or cut-off in the absence of an applied video signal or in response to a black reference level of the video signal, and also ensures a proper proportion of color signals at all brightness levels. The kinescope driver circuits associated with each electron gun are then adjusted for a desired gain (e.g., to compensate for kinescope phosphor inefficiencies) to assure a proper proportion of red, blue and green signal drive when the receiver operates normally.

The kinescope cut-off adjustment is time-consuming and inconvenient and typically must be performed several times during the life of the kinescope. In addition, the kinescope cut-off and gain adjustments often interact with each other, thereby requiring that successive adjustments be made. Therefore, it is advantageous to eliminate the need for this adjustment such as by having this adjustment performed automatically by circuits within the receiver.

An automatic kinescope bias control arrangement preferably should be capable of generating a kinescope bias control voltage and applying this voltage to appropriate kinescope bias control circuits in a manner which produces minimum interaction between the control voltage and the video signals coupled to the kinescope. Moreover, the automatic bias control arrangement should be applicable to kinescopes of the type having separately energized control grids associated with the individual cathodes of each electron gun, as well as kinescopes having control grids energized from a common source (e.g., kinescopes of the self-converging "in-line" type).

In accordance with the present invention, automatic kinescope bias control apparatus which satisfies these criteria is provided in a system for processing an image representative video signal having periodically recurring image intervals and blanking intervals. The system also includes an image reproducing kinescope having an intensity control electrode, and a video amplifier for supplying a finally amplified video signal to the kinescope electrode from an output of the amplifier. An output circuit of the amplifier includes a load impedance coupled between the amplifier output and a source of operating potential. A sensing network senses the magnitude of current conducted by the kinescope electrode, and a signal translating network coupled to the sensing network and operative during blanking intervals of the video signal derives a control voltage indicative of deviations of the kinescope electrode current from a desired level during the blanking intervals. The control voltage is coupled to the amplifier output circuit for varying the quiescent current through the load impedance and the quiescent voltage at the amplifier output, independent of the video signal, in a direction to reduce the difference between the sensed kinescope electrode blanking current and the desired blanking current level to a minimum.

In accordance with an embodiment of the invention, the cathode blanking current is sensed by a photo coupling network including a light emitting diode disposed in the cathode current path, and a light sensitive diode optically coupled to the light emitting diode. The latter diode emits an amount of light proportional to the cathode blanking current, and this light is sensed by the light sensitive diode to provide a corresponding output signal from which the control voltage is developed.

Figure 4:
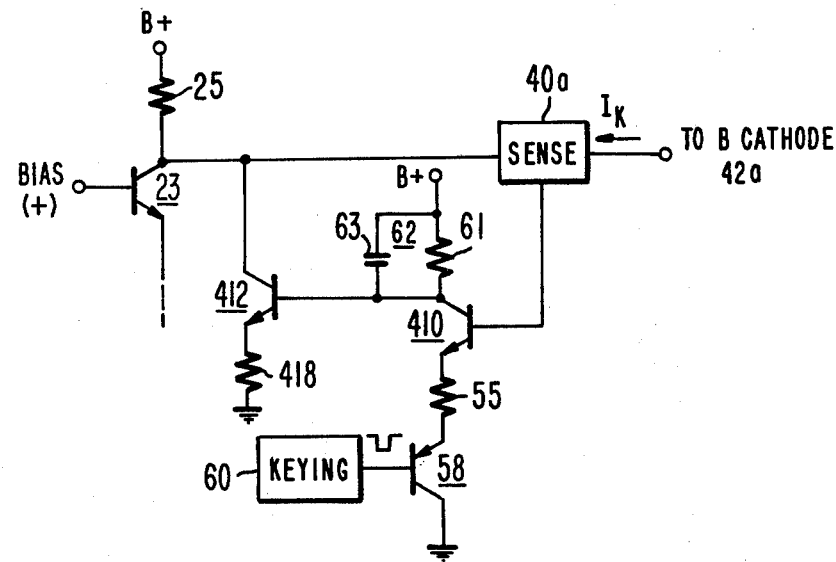

In the drawing:

FIG. 1 of the drawing illustrates a diagram, partially in block form and partially in schematic circuit diagram form, of a portion of a color television receiver employing apparatus constructed in accordance with the present invention; and FIGS. 2-4 depict alternate embodiments of the present invention.

Referring to FIG. 1, television signal processing circuits 10 including, for example, a video detector, provide luminance (Y) and chrominance (C) signal components to a demodulator-matrix 12 which, in turn, provides color video signals, B, R and G (i.e., blue, red and green image representative signals) to respective similar video driver amplifiers 20a (shown in circuit form), 20b and 20c. Amplified video output signals are supplied from each of amplifiers 20a, 20b and 20c to respective intensity control cathode electrodes 42a, 42b and 42c of a color image reproducing kinescope 44 of the in-line gun type in this example. Since amplifiers 20a, 20b and 20c are substantially identical, only amplifier 20a and the associated circuits will be described in detail.

Video amplifier 20a comprises a cascode arrangement of a common emitter transistor 22 and a common base transistor 23. The emitter of transistor 22 is coupled via a resistor 24 to a source of operating reference potential 30 including a transistor 31. Potential supply 30 also provides an operating reference potential for video amplifiers 20b and 20c. The collector output of common base transistor 23 is coupled to an operating supply voltage (B+) via a load resistor 25 and a collector-emitter current path of an emitter follower transistor 28 which provides a control voltage at low impedance from its emitter electrode as will be discussed.

The base of common emitter transistor 22 is supplied with video signal B from demodulator-matrix 12, and an amplified version of signal B appears at the collector output of transistor 23. This signal is D.C. coupled to the B signal cathode 42a of kinescope 44 via a diode 38 contained within a current sensing network 40a. In this example, kinescope 44 is of the in-line gun type with a commonly energized grid 45 associated with each of the electron guns comprising cathode electrodes 42a, 42b, and 42c. Grid 45 is suitably biased from a fixed source of positive direct potential $+V_2$ (e.g., +20 volts).

Current sensing network 40a serves as a photo coupling network and includes a light emitting diode (LED) 38 optically coupled to a light sensitive diode 39 biased from a source of direct potential (B+ in this instance). Diode 38 is disposed in the cathode current ($I_K$) path between cathode 42a and the collector output of transistor 23. An output of diode 39 is coupled to a bias control Bias control circuit 50a comprises a pair of keyed, low voltage differentially connected transistors 52 and 54, a filter network 62, and low voltage emitter follower transistor 28. The base electrode of transistor 54 is held at a fixed bias (e.g., +210 volts) supplied from a source of reference potential 53, while bias supplied to the base electrode of transistor 52 from the output of sensing network 40a varies in accordance with the conduction of diode 39, which in turn varies in accordance with the current conduction of diode 38. An operating reference voltage for differential transistors 52, 54 is supplied from a voltage source comprising a transistor 58 and a resistor 55 arranged as shown. Transistor 58 and therefore transistors 52 and 54 are keyed to conduct in response to periodic negative-going keying pulses supplied from a source 60.

In this example, the keying pulses occur during each horizontal blanking (retrace) interval, at which time image information is not present in the video signal. During this time, differential amplifier 52, 54 senses the current flowing through diode 39 (which current is proportional to the cathode current $I_K$ flowing through diode 38) and provides a control voltage at the collector output of transistor 54 proportional to the current through diode 38. The sensed current corresponds to the level of cathode current $I_K$ present during this blanking interval, and accordingly will be referred to as the cathode blanking current. The control voltage is filtered by the parallel combination of a resistor 61 and a filter capacitor 63 forming network 62. The filtered control voltage appears across capacitor 63 and is coupled to a base input of follower transistor 28. The control voltage also appears at the emitter of transistor 28 (reduced by the base-emitter junction voltage drop of transistor 28), and serves to vary the quiescent current through load resistor 25 and the collector voltage of transistor 23.

Video driver amplifiers 20b and 20c also have respectively associated sensing networks 40b and 40c and bias control networks 50b and 50c, which are arranged and operate in the same manner as sensing network 40a and control circuit 50a associated with amplifier 20a. Therefore, the following description of the operation of the automatic kinescope bias control circuit with respect to signal B and video amplifier 20a also applies to amplifiers 20b, 20c and the associated R and G cathode signals.

Under normal conditions, the system shown in FIG. 1 is designed to provide a given cathode blanking current. Specifically, signal blanking and associated signal processing circuits contained within signal processor unit 10 are arranged so that kinescope 44 is caused to conduct a small amount of cathode current (e.g., of the order of five microamperes) during each horizontal blanking interval. This can be accomplished, for example, by arranging the signal blanking circuits within unit 10 such that the blanking signals produced by these circuits do not completely cut off the input signal to driver 20a during the horizontal blanking intervals. In this manner, during the horizontal blanking intervals a small amount of current will be conducted by video driver stage 20a. This small current corresponds to the cathode blanking current which is sensed by network 40a, and produces virtually no visible effect on a reproduced image. The normal collector voltage of video output transistor 23 essentially establishes the operating voltage of cathode 42a. During the horizontal blanking intervals, this collector voltage is such that the cathode to grid voltage of the B signal electron gun of kinescope 44 produces the given level of cathode blanking current.

Light emitting diode 38 within sensing network 40a senses the cathode blanking current and emits an amount of light proportional to the cathode blanking current. The light emission of diode 38 is sensed by light sensitive diode 39 which is optically coupled to but electrically isolated from diode 38 and the cathode current path. The current then induced in diode 39 supplies a given amount of base current drive for differential transistor 52, which is conductive at this time since current source transistor 58 is keyed to conduct during the blanking interval noted previously. In this example, the differential amplifier circuit including transistors 52, 54 is arranged so that under normal conditions, the current supplied from source 58 divides equally between the emitters of transistors 52 and 54 (although a different manner of current division could have been selected) to produce a given collector voltage of transistor 54 for this condition. A filtered version of this collector voltage appears across capacitor 63 at the junction of capacitor 63 and resistor 61. Resistor 61 assists to establish the filtered voltage at an equilibrium level after the initial few keying cycles for a given level of cathode current, and also serves to establish the gain of the control loop including circuit 50a. The time constant of filter network 61, 63 (e.g., 100 milliseconds) is selected so that the filtered voltage is maintained on capacitor 63 substantially for the duration of a horizontal image interval in this example. The filtered voltage also appears at the base of follower transistor 28, and a proportional voltage appears at the emitter of transistor 28 (i.e., the base voltage less the base-emitter junction voltage drop of transistor 28). The normal collector output voltage of transistor 23 corresponds to the emitter voltage of transistor 28 developed in the manner discussed, less the voltage drop across load resistor 25.

When the cathode blanking current deviates from the normally expected level (e.g., due to long term aging of the kinescope or due to a momentary change in the operating characteristics of kinescope 44), the collector voltage of the video output transistor 23 is controlled to change in a direction to compensate for this deviation. That is, the collector voltage of transistor 23 is varied in a direction to maintain a cathode-to-grid voltage which corresponds to the normal, desired blanking level of cathode current $I_K$.

For example, when the cathode blanking current increases, diode 38 conducts additional current causing increased light emission which is sensed by diode 39. The conduction of diode 39 increases a corresponding amount, thereby supplying additional base current drive to differential transistor 52. When transistors 52 and 54 are rendered conductive during the keying (blanking) interval, by differential action the collector voltage of transistor 54 is caused to increase above the normal collector voltage level. Accordingly, the filtered voltage appearing on capacitor 63 and at the base of transistor 28 increase a proportional amount, which in turn causes the emitter voltage of transistor 28 and the collector voltage of output transistor 23 to also increase. This increased collector voltage is of a magnitude and direction to reduce the cathode blanking current toward the normal level. The reduced cathode blanking current is accompanied by a corresponding reduction in the quiescent collector load current of transistor 23. The emitter current of transistor 23 remains substantially unchanged, since this current is determined by the current supplied by source 30.

Observations analogous to the above also apply in the event the cathode blanking current decreases below the normal level in a "blacker-than-black" direction. In this case, the collector voltage of transistor 23 is reduced a compensating amount.

The described control arrangement is particularly attractive since, by applying the control voltage at a low impedance via the emitter of transistor 28 as discussed, the quiescent collector current and voltage of transistor 23 are controlled in a manner which preserves the desired normal blanking level of cathode current without causing undesirable interaction between the control voltage and the video signals coupled from the collector of transistor 23 to cathode 42a (i.e., the control path is essentially isolated from the cathode video signal path). The use of optically coupled sensing network 40a is also advantageous since such a network electrically isolates the cathode current path from control circuit 50a. In addition, both sensing network 40a and control circuit 50a (with the possible exception of filter capacitor 63) can be formed as an integrated circuit. Although it is considered impractical at the present time to fabricate the high voltage transistors of video driver 20a within an integrated circuit, recent developments in integrated circuit technology indicate that it will be practical to integrate such high voltage transistors in the near future. In that event, virtually the entire video driver stage including the automatic bias control circuit can be formed within the confines of a single monolithic integrated circuit.

The arrangement of FIG. 2 is identical to that of FIG. 1, except that filter network 62 has been modified.

In FIG. 2, the control voltage representative of the blanking level of cathode current $I_K$ developed at the collector output of transistor 54 is applied to filter capacitor 63 via a keyed electronic switch 64. Keying pulses supplied to switch 64 from source 60 (FIG. 1) serve to render switch 64 "closed" during each interval when it is desired to sample the cathode blanking current, and "open" at other times to decouple charge storage capacitor 63 from the collector of transistor 54 and resistor 61. In this example, the keying pulses are applied to switch 64 rather than to current source transistor 58 as in FIG. 1. This particular arrangement of network 62 corresponds to a sample and hold network which provides a more accurate control voltage to transistor 28 compared to the arrangement of FIG. 1, since, except for the negligible base current drawn by transistor 28, the charge stored on capacitor 63 is retained substantially without depletion during the time between sampling intervals. The sample and hold network including capacitor 63 and switch 64 can be implemented, for example, in accordance with the differential sample and hold circuit described in my U.S. Pat. No. 3,740,456.

The arrangement of FIG. 3 accomplishes the same result as that of FIG. 1, except that a different cathode current sensing arrangement is employed. Except as discussed below, the circuit of FIG. 3 is identical to that of FIG. 1.

In FIG. 3, the cathode blanking current is sensed by means of a sensing resistor 340 arranged in series in the current path from cathode 42a to the collector of transistor 23. A control network 350 includes filter network 62 and transistor 28 (as in FIG. 1) as well as a differential amplifier comprising differentially connected high voltage transistors 352, 354 and a current source including a high voltage NPN transistor 358 coupled to the joined emitters of transistors 352, 354, and an associated emitter resistor 355. In this embodiment, positive-going keying pulses are employed to key current source transistor 358 during the blanking interval noted earlier.

The base input electrodes of transistors 352 and 354 are connected to opposite ends of resistor 340 to sense the differential voltage developed across resistor 340 in response to the level of cathode blanking current. A control voltage developed at the collector of transistor 352 during the keying interval is filtered by capacitor 63 and coupled to the collector of transistor 23 via transistor 28.

If the cathode blanking current deviates from the normal level such as by increasing above the normal level, the end of resistor 340 remote from the collector of transistor 23 becomes more positive than normal. By differential action of transistors 352 and 354 during the keying interval, the collector voltage of transistor 352 increases a proportional amount, which in turn causes the collector voltage of transistor 23 to increase so as to reduce the cathode blanking current toward the normal level, in the manner discussed in connection with FIG. 1.

In the embodiment shown in FIG. 4, the output current from sensing network 40a (i.e., the current from diode 39 in FIG. 1) supplies base current to a transistor 410 to control the current conduction thereof. Transistor 410 is rendered conductive when current source transistor 58 is keyed to conduct as described in connection with FIG. 1, and filter network 62 coupled to the collector output of transistor 410 serves the same purpose as noted with regard to the arrangement of FIG. 1. A filtered control voltage developed at the collector of transistor 410 in accordance with the magnitude of the sensed cathode blanking current is utilized to control the collector voltage and current of video output transistor 23 by controlling the current conduction of a transistor 412 from a normal level of conduction. Transistor 412 and an associated emitter resistor 418 represent a current source coupled between the collector output of transistor 23 and ground.

When the cathode blanking current deviates from a normal value in a positive direction, for example, the base current drive supplied to transistor 410 from the output of sensing network 40a increases, causing the current conduction and collector voltage of transistor 410 to increase and decrease, respectively. The decreased collector voltage of transistor 410 in turn causes the current condition and collector voltage of current source transistor 412 to decrease and increase, respectively. This action causes the collector voltage and current of amplifier transistor 23 to respectively increase and decrease a corresponding amount such that the cathode blanking current is reduced toward the normal blanking level.

Although the invention has been described with reference to particular embodiments, various additional modifications can be made within the scope of the invention.

For example, the bias control voltage can be employed to control the output operating voltage of the video drivers in a system wherein the drivers apply the amplified video signals to respective separate control grids associated with each electron gun of the kinescope. In this instance, the output operating voltage of the video drivers will serve to controllably establish the operating voltages of the separate grid electrodes, instead of the respective cathode voltages as in the illustrated embodiments.

The cathode currents can be sensed during intervals other than that described, in accordance with the requirements of a particular system. For example, the cathode currents can be sensed during the first few scanning lines after each vertical retrace interval. Examples of this sensing technique are described in an article entitled "Permanent Colour Truth" by E. A. Jensen (from a publication by Bang and Olufsen Company, Denmark), and in an article by P. J. H. Janssen, et al., entitled "Automatic Stabilization of Background Color in Color TV Receivers" (IEEE Transactions on Consumer Electronics, February, 1977). With this technique, the video signal is decoupled and a local reference voltage is employed during the measuring interval to induce a cathode blanking current. Deviations of this cathode current from an expected level are sensed and compensated for by associated control circuits. Sensing the cathode current at this time produces no visible effect on a displayed image since the kinescope is overscanned at this time (i.e., the kinescope electron beam is deflected to strike the face of the kinescope above the image area).

What is claimed is:

1. In a system for processing an image representative video signal having periodically recurring image intervals and blanking intervals, said system including an image reproducing kinescope having an intensity control electrode; a video amplifier for supplying a finally amplified video signal to said kinescope electrode from an output of said amplifier; a source of operating potential; and an output circuit for said amplifier, including a load impedance, coupled between said source of operating potential and said amplifier output, apparatus comprising:

means for sensing the magnitude of current conducted by said kinescope electrode;

means coupled to said sensing means for deriving a control voltage during said blanking intervals indicative of deviations of said electrode current from a desired level during said blanking intervals; and means for coupling said control voltage to said output circuit for varying the quiescent current through said load impedance and the quiescent voltage at said amplifier output, independent of said video signal, in a direction to reduce the difference between said sensed electrode blanking current and the desired blanking current level to a minimum.

2. Apparatus according to claim 1, wherein:
said blanking interval corresponds to a horizontal retrace blanking interval of said video signal.

3. Apparatus according to claim 1, wherein:
said amplifier output circuit further includes a transistor having a first electrode for receiving said control voltage, a second electrode coupled to said source of operating potential, and a low impedance third electrode coupled to said load impedance.

4. Apparatus according to claim 1, wherein:
said sensing means comprises an impedance element disposed in a current path between said amplifier output and said intensity control electrode; and
said control voltage deriving means includes means responsive to a differential voltage developed across said impedance element in accordance with the level of current conducted by said intensity control electrode.

5. In a system for processing an image representative video signal having periodically recurring image intervals and blanking intervals, said system including an image reproducing kinescope having an intensity control electrode; a video amplifier for supplying a finally amplified video signal to said kinescope electrode from an output of said amplifier; a source of operating potential; and an output circuit for said amplifier, including a load impedance, coupled between said source of operating potential and said amplifier output, apparatus comprising:

means for sensing the magnitude of current conducted by said kinescope electrode;

means coupled to said sensing means for deriving a control voltage during said blanking intervals indicative of deviations of said electrode current from a desired level during said blanking intervals; and means for coupling said control voltage to said output circuit for varying the quiescent current through said load impedance and the quiescent voltage at said amplifier output, independent of said video signal, in a direction to reduce the difference between said sensed electrode blanking current and the desired blanking current level to a minimum; wherein said control voltage coupling means comprises a transistor having a main current conduction path arranged in parallel with a main current conduction path of said amplifier and arranged in series with said load impedance, and an input electrode for recieving said control voltage, the conduction of said transistor and thereby said quiescent current and voltage at said amplifier output being controlled in accordance with the magnitude of said control voltage.

6. In a system for processing an image representative video signal having periodically recurring image intervals and blanking intervals, said system including an image reproducing kinescope having an intensity control electrode; a video amplifier for supplying a finally amplified video signal to said kinescope electrode from an output of said amplifier; a source of operating potential; and an output circuit for said amplifier, including a load impedance, coupled between said source of operating potential and said amplifier output, apparatus comprising:

means for sensing the magnitude of current conducted by said kinescope electrode, said sensing means comprising a photo coupling network including light emitting means disposed in a current path between said amplifier output and said intensity control electrode for sensing current conducted by said intensity control electrode and emitting a proportional amount of light; and light sensitive means optically coupled to said light emitting means for providing a signal indicative of said current sensed by said light emitting means;

means coupled to said sensing means for deriving a control voltage during said blanking intervals indicative of deviations of said electrode current from a desired level during said blanking intervals; and means for coupling said control voltage to said output circuit for varying the quiescent current through said load impedance and the quiescent voltage at said amplifier output, independent of said video signal, in a direction to reduce the difference between said sensed electrode blanking current and the desired blanking current level to a minimum.

7. Apparatus according to claim 6, wherein:
    said light emitting means and said light sensitive means each comprises a semiconductor diode.

8. In a system for processing an image representative video signal having periodically recurring image intervals and blanking intervals, said system including an image reproducing kinescope having an intensity control electrode; a video amplifier for supplying a finally amplified video signal to said kinescope electrode from an output of said amplifier; a source of operating potential; and an output circuit for said amplifier, including a load impedance, coupled between said source of operating potential and said amplifier output, said output circuit further including a transistor having a first electrode, a second electrode coupled to said source of operating potential, and a low impedance third electrode coupled to said load impedance, wherein said first, second and third electrodes correspond to base, collector and emitter electrodes and said transistor is arranged in emitter follower configuration; apparatus comprising:

means for sensing the magnitude of current conducted by said kinescope electrode;

means coupled to said sensing means for deriving a control voltage during said blanking intervals indicative of deviations of said electrode current from a desired level during said blanking intervals; and means for coupling said control voltage to said base electrode of said transistor in said output circuit for varying the quiescent current through said load impedance and the quiescent voltage at said amplifier output, independent of said video signal, in a direction to reduce the difference between said sensed electrode blanking current and the desired blanking current level to a minimum.

9. In a system for processing an image representative video signal having periodically recurring image intervals and blanking intervals, said system including an image reproducing kinescope having an intensity control electrode; a video amplifier for supplying a finally amplified video signal to said kinescope electrode from an output of said amplifier; a source of operating potential; and an output circuit for said amplifier, including a load impedance, coupled between said source of operating potential and said amplifier output, apparatus comprising:

means for sensing the magnitude of current conducted by said kinescope electrode;

means coupled to said sensing means for deriving a control voltage during said blanking intervals indicative of deviations of said electrode current from a desired level during said blanking intervals, said control signal deriving means including a differential amplifier having an input coupled to said sensing means, said differential amplifier being rendered conductive during said blanking intervals; charge storage means coupled to an output of said differential amplifier for providing said control voltage; and means for coupling said control voltage from said charge storage means to said amplifier output for controlling the quiescent voltage and current at said amplifier output; and means for coupling said control voltage to said output circuit for varying the quiescent current through said load impedance and the quiescent voltage at said amplifier output, independent of said video signal, in a direction to reduce the difference between said sensed electrode blanking current and the desired blanking current level to a minimum.

10. In a system for processing an image representative video signal having periodically recurring image intervals and blanking intervals, said system including an image reproducing kinescope having an intensity control electrode; a video amplifier for supplying a finally amplified video signal to said kinescope electrode from an output of said amplifier; a source of operating potential; and an output circuit for said amplifier, including a load impedance, coupled between said source of operating potential and said amplifier output, apparatus comprising:

means for sensing the magnitude of current conducted by said kinescope electrode;

means coupled to said sensing means for deriving a control voltage during said blanking intervals indicative of deviations of said electrode current from a desired level during said blanking intervals, said control voltage deriving means comprising signal translating means responsive to the output signal from said sensing means for developing a voltage representative of the magnitude of the output signal from said sensing means; and a sample and hold network including charge storage means and electronic switch means having an input coupled to said representative voltage and an output coupled to said charge storage means, said switch means being rendered conductive during said blanking intervals for coupling said representative voltage of said charge storage means to develop said control voltage and nonconductive at other times to decouple said charge storage means from said signal translating means; and means for coupling said control voltage to said output circuit for varying the quiescent current through said load impedance and the quiescent voltage at said amplifier output independent of said video signal, in a direction to reduce the difference between said sensed electrode blanking current and the desired blanking current level to a minimum.

11. In a system for processing an image representative video signal having periodically recurring image intervals and blanking intervals, said system including an image reproducing kinescope having an intensity control electrode; and a video amplifier for supplying an amplified video signal to said kinescope electrode from an output of said amplifier; apparatus comprising:

means coupled to said output of said amplifier for providing an operating voltage thereto;

light emitting means disposed in a current path between said amplifier output and said kinescope electrode for sensing the magnitude of current conducted by said electrode and emitting a proportional amount of light;

light sensitive means optically coupled to said light emitting means for providing a signal indicative of said electrode current sensed by said light emitting means;

means coupled to said light sensitive means for deriving a control voltage during said blanking intervals indicative of deviations of said electrode current from a desired level during said blanking intervals; and means for coupling said control voltage to said output of said amplifier for varying the output voltage of said amplifier output in a direction to reduce the difference between said sensed electrode blanking current and the desired blanking current level to a minimum.

12. In a system for processing an image representative video signal having periodically recurring image intervals and blanking intervals, said system including an image reproducing kinescope having a plurality of intensity control electron guns each having a cathode electrode and an associated grid electrode; a plurality of video amplifiers for supplying finally amplified video signals to respective cathode electrodes of said kinescope from outputs of said amplifiers; a source of operating potential; and respective output circuits for said amplifiers, each including a load impedance, coupled between said source of operating potential and said outputs of said amplifiers, apparatus comprising:

means for sensing the magnitude of respective cathode currents of said kinescope;

means coupled to said sensing means for deriving control voltages during said blanking intervals respectively indicative of deviations of said cathode currents from a desired level during said blanking intervals; and means for respectively coupling said control voltages to said amplifier output circuits for varying the quiescent current through said load impedances and the quiescent voltage at said amplifier outputs, independent of said video signal, in a direction to reduce the difference between said sensed cathode blanking currents and the desired blanking current level to a minimum.

13. Apparatus according to claim 12, wherein: said grid electrodes of said kinescope are energized from a common source.

* * * * *